United States Patent
Nakano et al.

(10) Patent No.: US 6,177,773 B1
(45) Date of Patent: Jan. 23, 2001

(54) REGENERATION CONTROL DEVICE FOR A HYBRID VEHICLE

(75) Inventors: Kenji Nakano; Shigetaka Kuroda; Teruo Wakashiro, all of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/395,979

(22) Filed: Sep. 15, 1999

(30) Foreign Application Priority Data

Sep. 18, 1998 (JP) .................................................. 10-303148

(51) Int. Cl.[7] .............................. B60K 6/00; B60K 41/26
(52) U.S. Cl. ........................... 318/376; 318/139; 477/40; 180/65.2
(58) Field of Search ..................................... 318/139, 375, 318/376, 377, 378; 180/65.2, 65.3, 65.4; 477/34, 40, 70, 71, 75

(56) References Cited

U.S. PATENT DOCUMENTS

| | | | |
|---|---|---|---|
| 5,650,713 | * 7/1997 | Takeuchi et al. | ........................ 322/16 |
| 5,984,034 | * 11/1999 | Morisawa et al. | ................... 180/65.2 |
| 6,033,338 | * 3/2000 | Jackson et al. | ......................... 477/44 |
| 6,059,064 | * 5/2000 | Nagano et al. | ....................... 180/243 |

* cited by examiner

Primary Examiner—Bentsu Ro
(74) Attorney, Agent, or Firm—Arent Fox Kintner; Plotkin & Kahn, PLLC (57) ABSTRACT

A regeneration control device for a hybrid vehicle includes an internal combustion engine, driving wheels drivable by the internal combustion engine, a motor for additionally supplying electric power for driving the driving wheels, a transmission between the engine, motor and driving wheels and an accumulator for supplying electric power to the motor, which causes the motor to work, while braking the vehicle, as a generator whose output is returned to the accumulator which in turn stores electric energy regenerated depending upon the deceleration degree. The control device also has calculating means for determining the degree of downward slope of a road whereon the vehicle is running and correcting means for correcting a regenerable energy amount according to the downward slope determined by the calculating means when using the motor as the generator, the output of which is thus corrected and returned to charge the accumulator in such a way that the accumulator may not rapidly be charged to its full capacity, thus preventing regeneration from being ineffective due to the full charge of the accumulator.

5 Claims, 11 Drawing Sheets

REGENERATION CONTROL DEVICE FOR A HYBRID VEHICLE

BACKGROUND OF THE INVENTION

The present invention relates to a regeneration control device for use in a hybrid vehicle powered by an engine and an assist motor, which device controls a regenerative deceleration system to charge a power accumulator with electric energy regenerated from the motor working as a generator while decelerating the vehicle.

Typically, a hybrid vehicle is powered by its engine and an assist motor and has a system of braking in which the motor becomes a generator, the output of which is determined depending upon a degree of deceleration of the vehicle and is returned to a power accumulator composed of batteries and condensers for supplying power to drive the motor.

However, the conventional regeneration control system of the hybrid vehicle, in which electric energy is generated by a driving motor-generator while the vehicle running downward on a slope using its regenerative deceleration system and is returned to a power accumulator of the driving motor, involves the following problem:

When driving the hybrid vehicle downward along a slope with frequently applying regenerative braking function, a driver may often experience that the accumulator is soon charged to its full capacity and further regenerative braking becomes ineffective. In this instance, the driver may lose the feeling in effective deceleration of the vehicle and may feel strange in driving the vehicle.

SUMMARY OF THE INVENTION

Accordingly, a primary object of the present invention is to provide a regeneration control device for a hybrid vehicle, which device can control a regenerative power system including an internal combustion engine, driving wheels drivable by the internal combustion engine, a motor for additionally supplying electric energy for driving the driving wheels, a transmission between the engine, motor and driving wheels and an accumulator for supplying the motor with electric power, wherein the motor during deceleration of the vehicle can work as a generator whose output is depending upon the deceleration degree and is returned to charge the accumulator, and which device has calculating means for determining the degree of slope of a road whereon the vehicle is running downward and regeneration correcting means for correcting an amount of electric energy to be regenerated from the motor-generator according to the downward road slope determined by the calculating means while the motor works as the generator whose output is therefore corrected by the correcting means in such a way that the accumulator may not be fully charged to assure effective regenerative braking while vehicle descending on the slope.

Another object of the present invention is to provide a regeneration control device for a hybrid vehicle, which is further provided with transmission correcting means for correcting a transmission gear ratio of an automatic transmission, if such is used, according to the degree of slope of a road, calculated by a calculating means while the vehicle running downward thereon applying its regenerative braking. This can give a driver a feeling of constant deceleration of the hybrid vehicle while driving the vehicle downward on the slope.

DETAILED DESCRIPTION OF PREFERRED EMBODIMENTS

Figure 1:
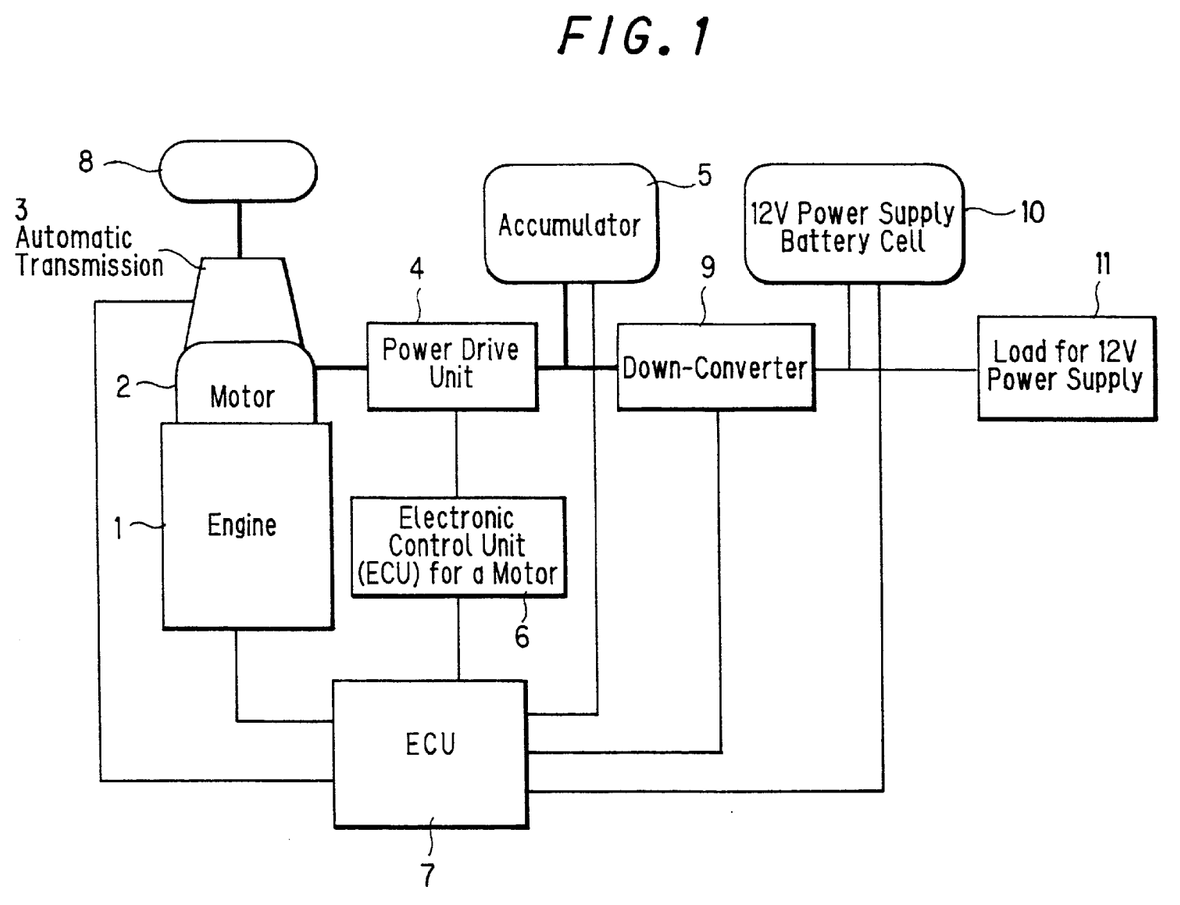
FIG. 1 is a construction block diagram of an exemplified system of a hybrid vehicle according to the present invention.

A system structure of a hybrid vehicle is shown in FIG. 1. The system includes driving arrangements composed of an engine 1, an engine-assist motor 2, an automatic transmission 3, a powered drive unit 4 for driving the motor and an accumulator 5 for supplying electric power to the motor and includes control arrangements composed of an electronic control unit ECU6 for performing the control of the driving motor and energy regeneration of the motor through the powered drive unit 4 and a central electronic control unit ECU7 for controlling the operation of the engine 1, changeably controlling a gear-ratio of the automatic transmission 3 and conducting a centralized control of the entire system.

In FIG. 1, numeral 8 designates driving wheels of the vehicle.

The electronic control unit (ECU) 7 calculates a degree of reducing a running speed of the vehicle in a known way and determines the energy regeneration at that time from the motor 2 to the accumulator 5 using a table of predetermined energy regeneration according to deceleration degrees.

The accumulator 5 includes a set of batteries or condensers, the highest output voltage of which is about 180 V.

The automatic transmission 3 may be of the type CVT (for continuous regulation) or AT (for step-by-step regulation).

The electronic control unit ECU 7 causes a down-converter 9 to reduce the voltage of the accumulator 5 to a predetermined voltage value to charge 12-volt power-supply battery 10. In FIG. 1, reference numeral 11 designates a load applied to the 12-volt power-supply battery 10.

Figure 2:
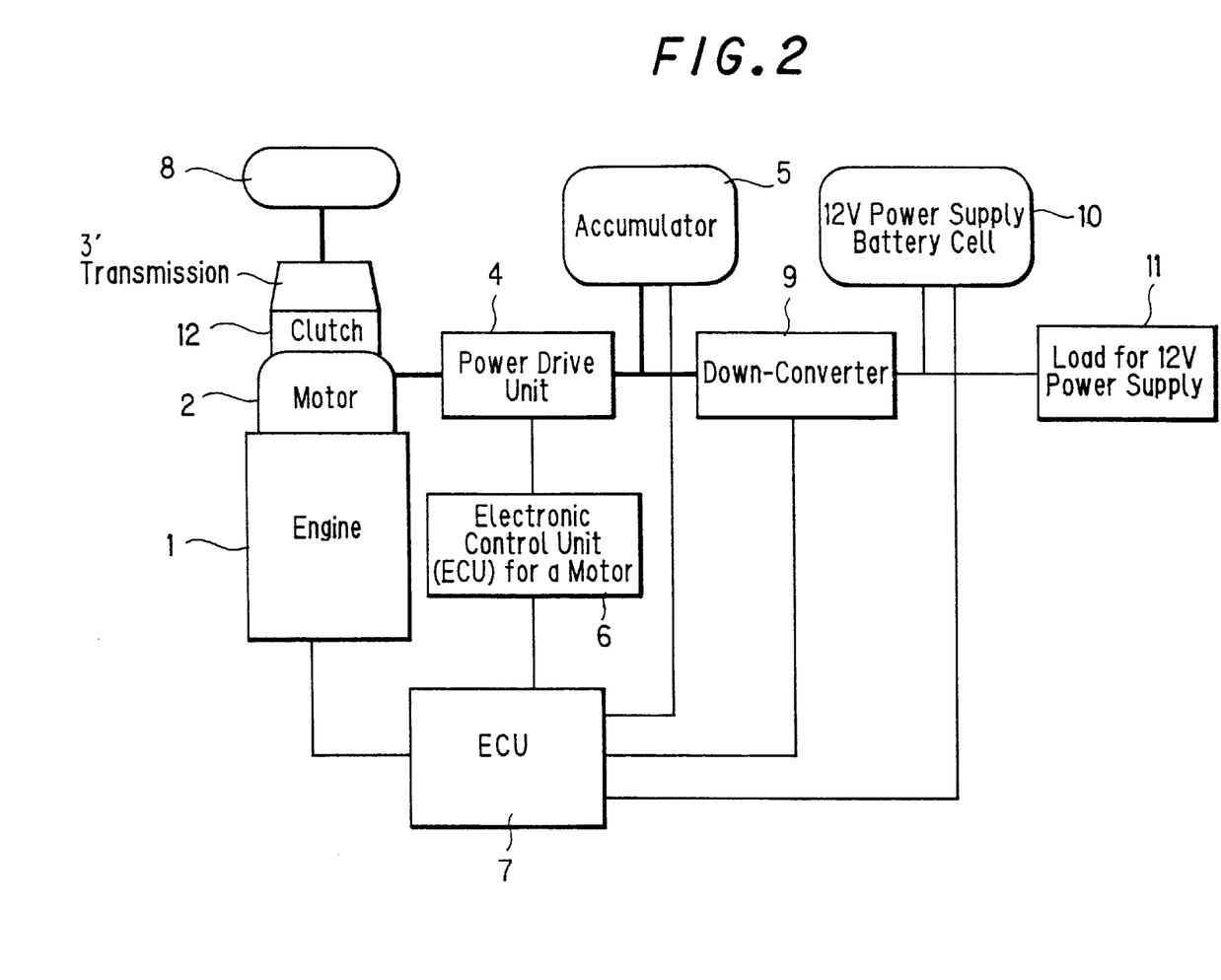
FIG. 2 is a construction block diagram of another exemplified system of a hybrid vehicle according to the present invention.

In FIG. 2, there is shown a system structure of a hybrid vehicle with a manually operated transmission 3' (MT) and a clutch 12. In this instance, the electronic control unit ECU 7 does not conduct the control of a gear ratio of the transmission 3' as it does with the automatic transmission 3 in FIG. 1. Others are similar to those of the system shown in FIG. 1.

The thus constructed system of the present invention can realize under the control of the electronic control unit ECU 7 that, when the vehicle is running on a downward road using its regenerative deceleration system, the degree of slope of the road is calculated, the gear-ratio of the automatic transmission 3 is set to a specified value corresponding to the calculated slope and, then, the regeneration of electric energy from the motor 2 to the accumulator 5 is corrected to adapt to the determined slope.

Figure 3:
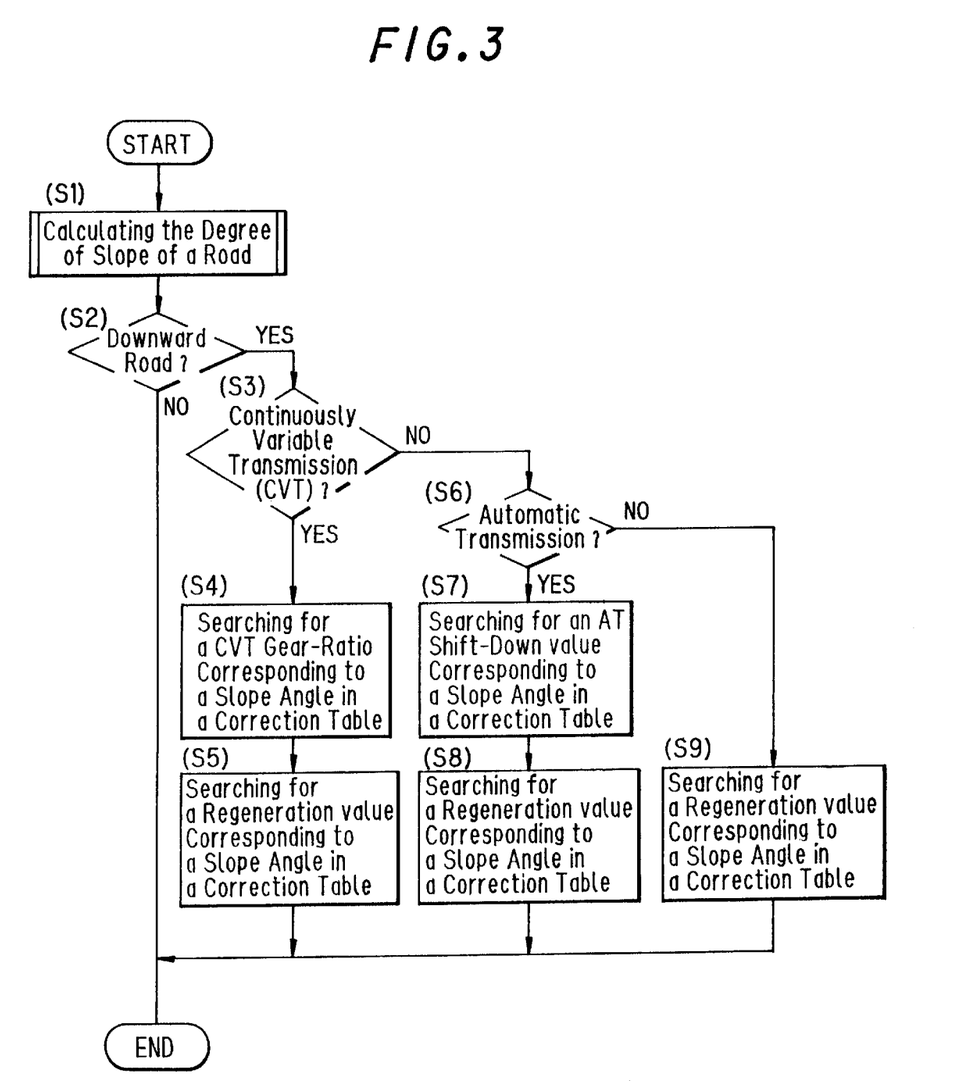
FIG. 3 is a flowchart depicting the regeneration control of a hybrid vehicle according to the present invention.

Referring to FIG. 3, the control operation of the regeneration control device will be described as follows:

In Step S1, the degree of slope of a road whereon the vehicle is descending is determined according to a specified calculation formula using detected values of the vehicle running speed, rotations per minute of the engine, negative suction pressure, throttle valve opening and so on, which are detected at the current state of the vehicle. In Step S2, the electronic control unit(ECU) 7 judges whether the vehicle is running downward on the slope according to the determined gradient. If so, the control unit ECU 7 examines whether the automatic transmission 3 is of the CVT type (for stepless regulation) in Step S3. If the vehicle is found not on the slope in Step S2, the processing is finished.

Figure 4:
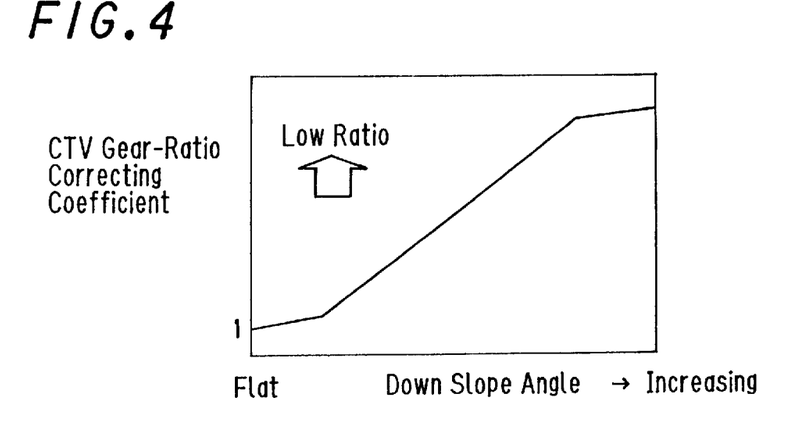
FIG. 4 shows a characteristic curve of a table of coefficients for correcting a gear ratio of CVT (continuously variable transmission) in accordance with the degree of slope of a road.
Figure 5:
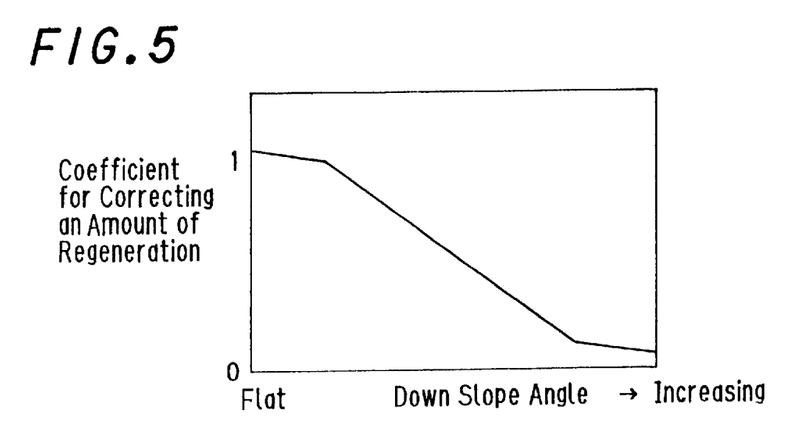
FIG. 5 shows a characteristic curve of a table of coefficients for correcting regeneration depending upon the degree of slope of a road.

If the automatic transmission 3 is of the CVT type, the control unit ECU 7, by searching in a table of coefficients for correcting a gear-ratio of the automatic transmission CVT according to the road gradient (as shown in FIG. 4), finds a correcting coefficient corresponding to the determined road gradient and regulates, using the correcting coefficient, the gear ratio of the transmission to be of a specified reduced value (in Step S4). Then, the control unit ECU 7 searches in a table of coefficients for correcting a regeneration value according to road gradient (as shown in FIG. 5) to find a correction coefficient corresponding to the determined road gradient and, then, regulates the preset regeneration value to a specified reduced value using the determined correction coefficient (in Step S5).

In this instance, the regeneration value must be reduced by such a value that can cancel an increase of deceleration G due toreduction of the gear ratio.

Figure 6:
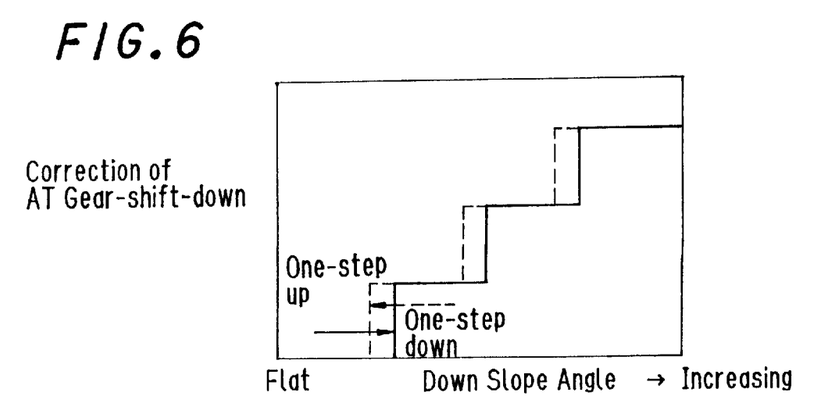
FIG. 6 shows a characteristic curve of tabulated coefficients for correcting an AT (automatic transmission) gear shift-down value according to the degree of slope of a road.

If the automatic transmission 3 was found not to be of the CTV type (in Step S3), the control unit ECU 7 examines whether the automatic transmission 3 is of the AT type (for step-by-step regulation) in Step S6. If so, the control unit ECU 7 searches in a correction table for correcting a gear-shift-down position of the AT type transmission according to road gradient (as shown in FIG. 6) to find a correction value corresponding to the determined road-gradient and regulates the preset position of the AT type transmission to a specified sifted-down position (in Step S7). After this, the control unit ECU 7 searches in a table of coefficients for correcting regeneration energy according to road gradient (as shown in FIG. 5) to find a correction coefficient corresponding to the determined road gradient and, then, regulates the preset regeneration value to a specified reduced value using the determined correction coefficient (in Step S5).

In this instance, the regeneration value must be reduced by such a value that can cancel an increase of deceleration G resulted from setting the AT type transmission into the sift-down position.

Figure 7:
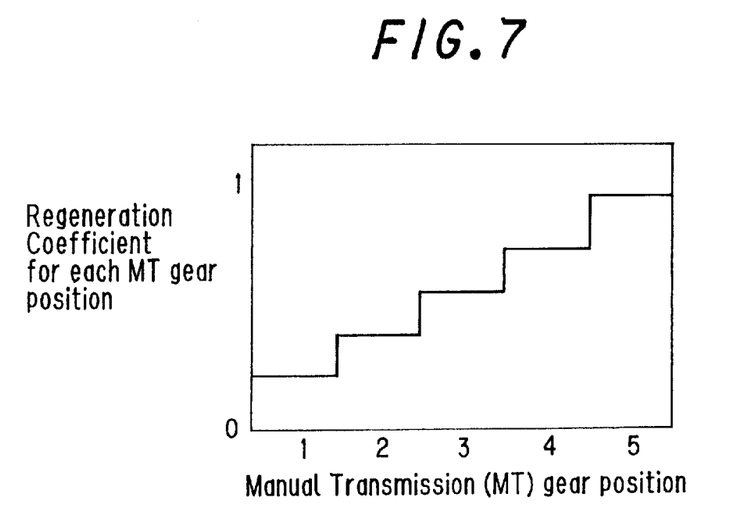
FIG. 7 shows a characteristic curve of tabulated coefficients for correcting regeneration in accordance with an MT (manual transmission) gear position.

If the automatic transmission is found not to be of the AT type, the control unit ECU 7 considers the transmission as a manually operated transmission 3' (MT) and searches for a regeneration correction coefficient corresponding to the MT transmission position in a table of coefficients for correcting the regeneration value according to MT-type transmission positions (as shown in FIG. 7) and regulates, using the obtained correction coefficient, the regeneration value predetermined according to the deceleration degree to be reduced by a specified value.

Thus, the regeneration control device according to the present invention can decrease a gear ratio or shift down a gear position of the automatic transmission 3 according to the gradient of a road on which the vehicle is descending using regenerative deceleration system and can also reduce the regeneration preset according to a deceleration degree by a specified value in order to prevent variation of deceleration G and decrease a charging rate (per hour) of the accumulator. This prevents the accumulator from being fully charged causing the further regeneration to be unable while the vehicle is descending on a slope. Even if the accumulator 5 should be full with a charge of regenerated energy and could not further store the regenerated energy while the vehicle descending on the slope, a driver may not feel strange and may keep a feeling of deceleration since a change of deceleration G is small owing to the previously reduced regeneration.

With the manually operated transmission MT 3 in the low gear position selected by the driver of the vehicle when descending on the slope, the regeneration control device can suitably reduce the regeneration to realize the above-mentioned effects.

Figure 8:
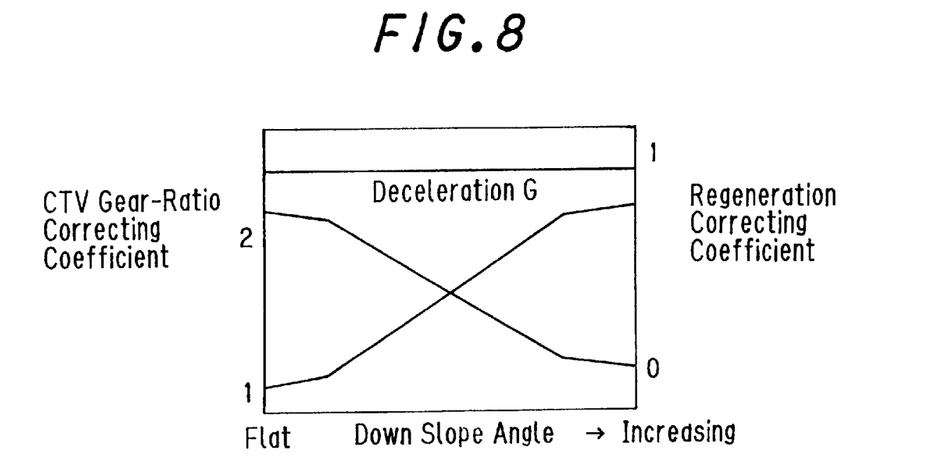
FIG. 8 shows a graph representing a correlation between the CVT gear ratio correcting coefficients and the electric-power regeneration correcting coefficients according to a road slope.

As seen from the graph of FIG. 8, the regeneration control device with the CVT type automatic transmission 3 can conduct such cooperative control for correcting the gear ratio of the transmission and the regeneration so as to obtain a constant deceleration G-value. Such cooperative control assures more adaptive control of the regenerative deceleration system of the vehicle.

Figure 9:
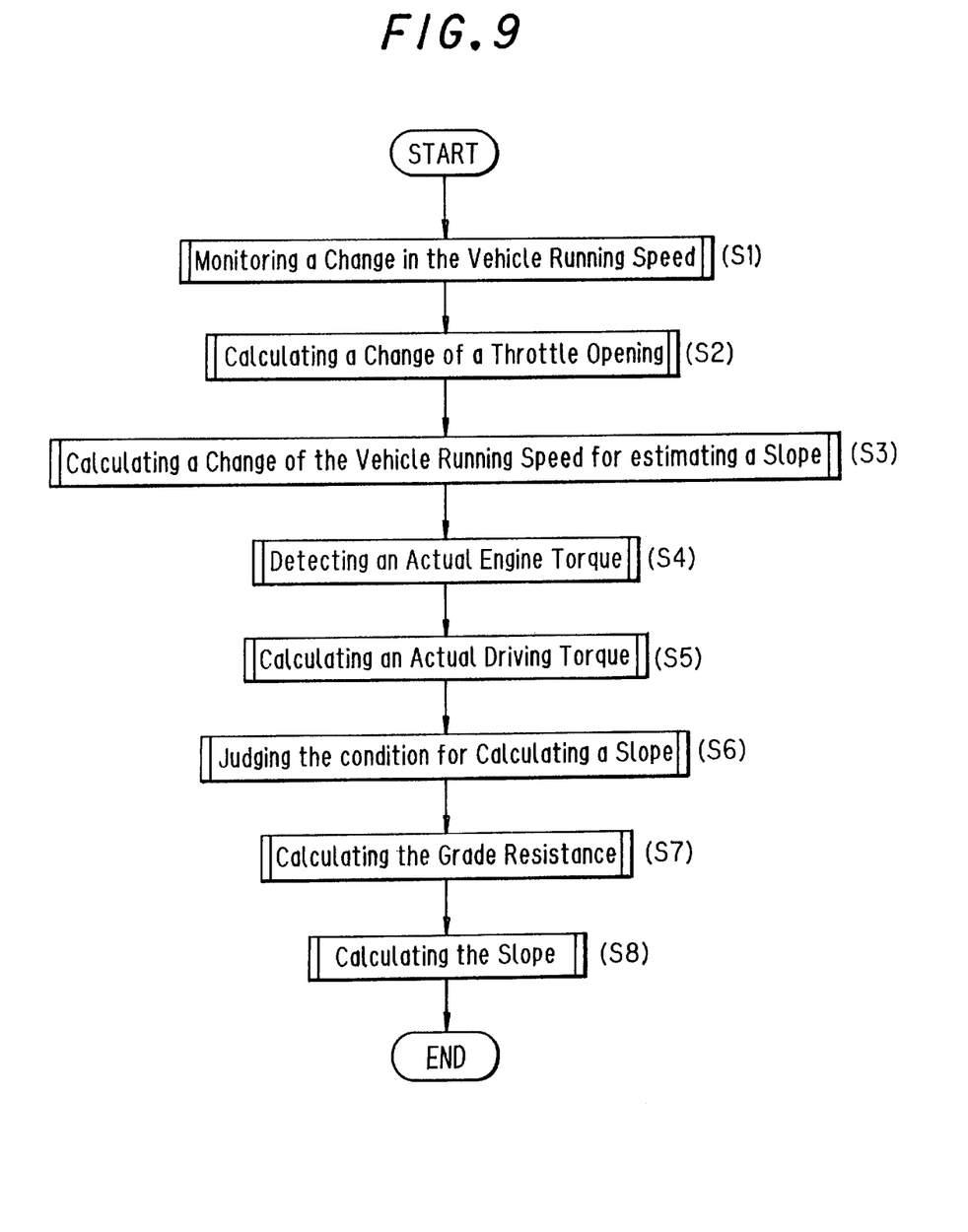
FIG. 9 is a flowchart depicting the processing of calculating a road slope.

Referring now to a flowchart of FIG. 9, the operation for determining the degree of slope of a road whereon the vehicle is running downward will be described as follows:

In Step S1, the regeneration control device monitors the vehicle's running speed whether a change in running velocity is maintained lower than a specified upper acceleration limit for a specified duration preset by a timer included in the control unit ECU 7 of the system.

Figure 10:
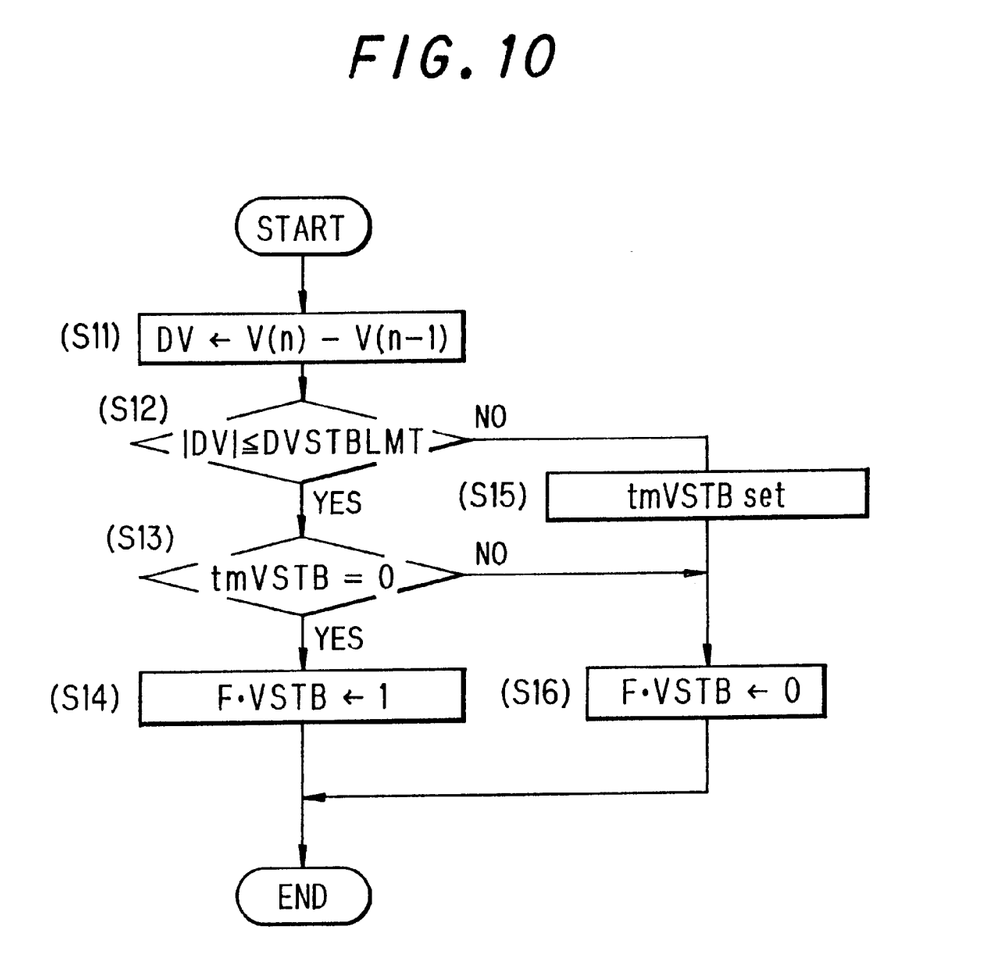
FIG. 10 is a flowchart depicting the operation of monitoring variations in vehicle running speed.

FIG. 10 depicts the operation of the vehicle's speed variation monitor. If the vehicle is found on the downward road, the regeneration control device determines, in Step S11, a current acceleration DV as a difference between current value V(b) and preceding value V(n−1) of the running speed of the vehicle, which data was sampled at a specified interval (1 second). Then, the control device examines whether the current acceleration value |DV| is not more than an upper limit value DVSTBLM (in Step S11). If |DV|≦DVSTBLM, the control device further examines whether a timer tmVSTV for monitoring the vehicle running speed-variation indicates zero or not (in Step S13). With the timer set to zero, the control device sets a speed-variation flag F.VSTB to 1 (in Step S15) and ends the processing. If the term |DV|≦DVSTBLM was not realized, the control device sets the time tmVSTV to zero (in Step S16) and, then, the Flag F.VSTB to zero (in Step S16) and ends the processing. With the timer tmVSTV indicating a value other than zero in Step S23, the control device sets the Flag F.VSTB to zero in Step S16 and ends the processing.

In Step S2 of the road-gradient calculation processing, the control device calculates a change of throttle opening by subtracting a present value from a preceding value, which were sampled at a specified interval (110 mS).

In Step S3 of the road-gradient calculation processing, the control device calculates a vehicle-running-speed variation corresponding to acceleration to estimate a road gradient. In this instance, the control device calculates an average value of the vehicle running speed using a preset averaging coefficient for moderating the variation of the vehicle running speed and obtains a difference between the averaged values of present and preceding speed variations, which will be used for estimating the road gradient.

In Step S4 of the road-gradient calculation processing, the control device determines an actual engine-torque value corresponding to the predetermined number-of-rotations Ne of the engine and a negative suction pressure PB by searching in a mapped table using specified values Ne and PB.

In Step S5 of the road-gradient calculation processing, the control device determines an actual driving torque from the actual engine torque and the gear ratio.

Figure 11:
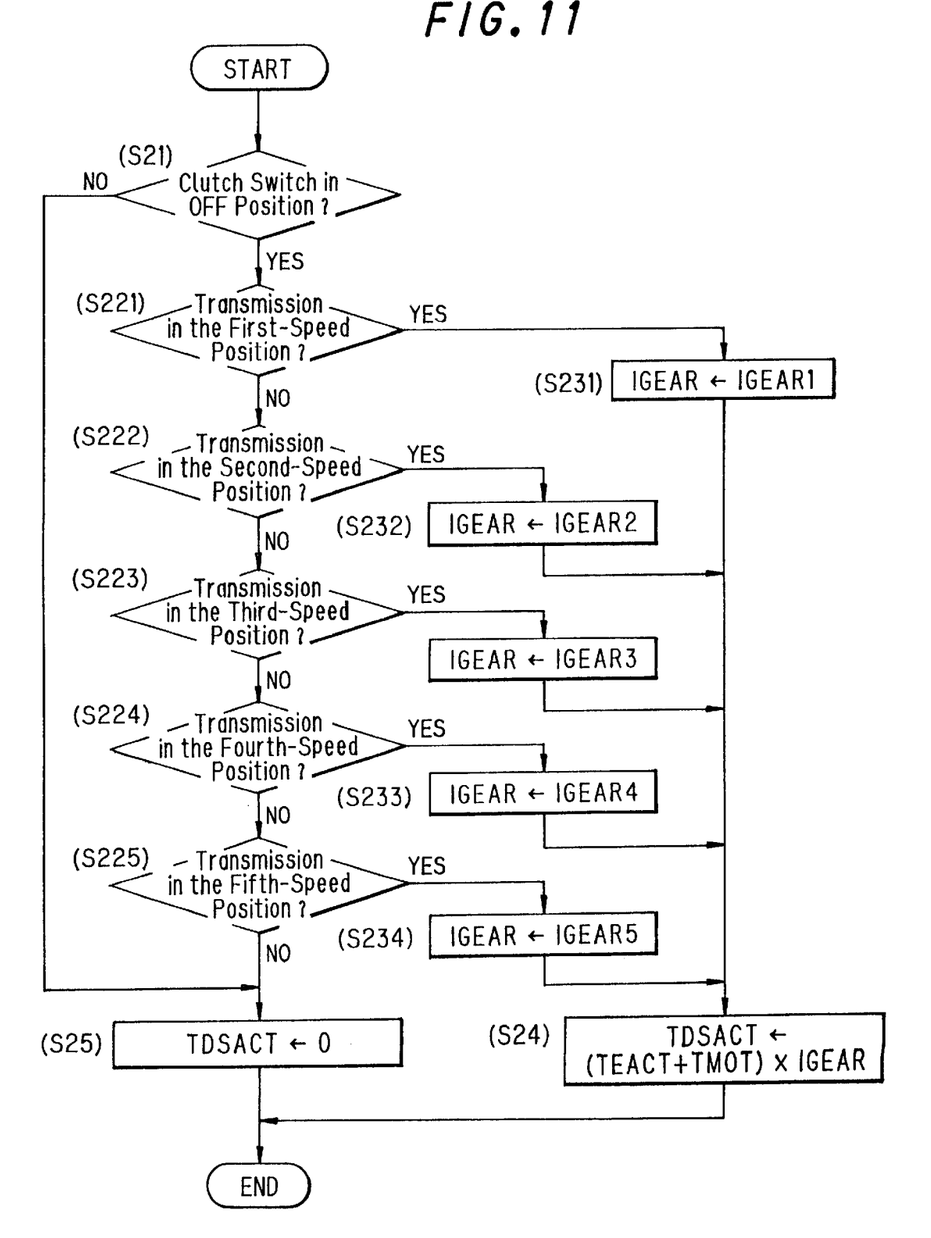
FIG. 11 is a flowchart depicting the processing of calculating an actual driving-torque value.

Referring to a flowchart of FIG. 11, the calculation of an actual value of driving torque will be described as follows:

The regeneration control device (ECU 7) examines whether a clutch switch is in the OFF position (in Step S21). If the clutch switch is in the OFF position, then the control device examines which position from 1 to 5 the transmission gear is set in (in Steps S222 to S225). If the transmission gear is in the first-speed position, the control device adopts an overall gear ratio IGEAR1 at the first speed as an overall gear ratio IGEAR for calculating an actual driving torque (in Step S231) and then determines the actual driving torque TDSACT by multiplying the overall gear ratio IGEAR by a sum of an actual engine torque TEACT and an actual motor torque TMOT (in Step S24). With the transmission gear set in the second-speed position, the control device adopts an overall gear ratio IGEAR2 at the second speed as an overall gear ratio IGEAR for calculating an actual driving torque (in Step S232) and then determines the actual driving torque TDSACT by multiplying the overall gear ratio IGEAR by a sum of an actual engine torque TEACT and an actual motor torque TMOT (in Step S24). Similarly, an actual driving torque is calculated when the transmission gear is in the third, fourth or fifth speed position. Finally, if the transmission is out of the above-mentioned positions 1 to 5, the control device sets the actual driving torque to zero (in Step S25) and ends the processing. If the clutch switch is not in the OFF position (in Step S11), the control unit sets the actual driving torque to zero (in Step S25) and ends the processing.

In Step S6 of the road-gradient calculation operation, the control device discriminates conditions of calculating the road gradient as follows.

Figure 12:
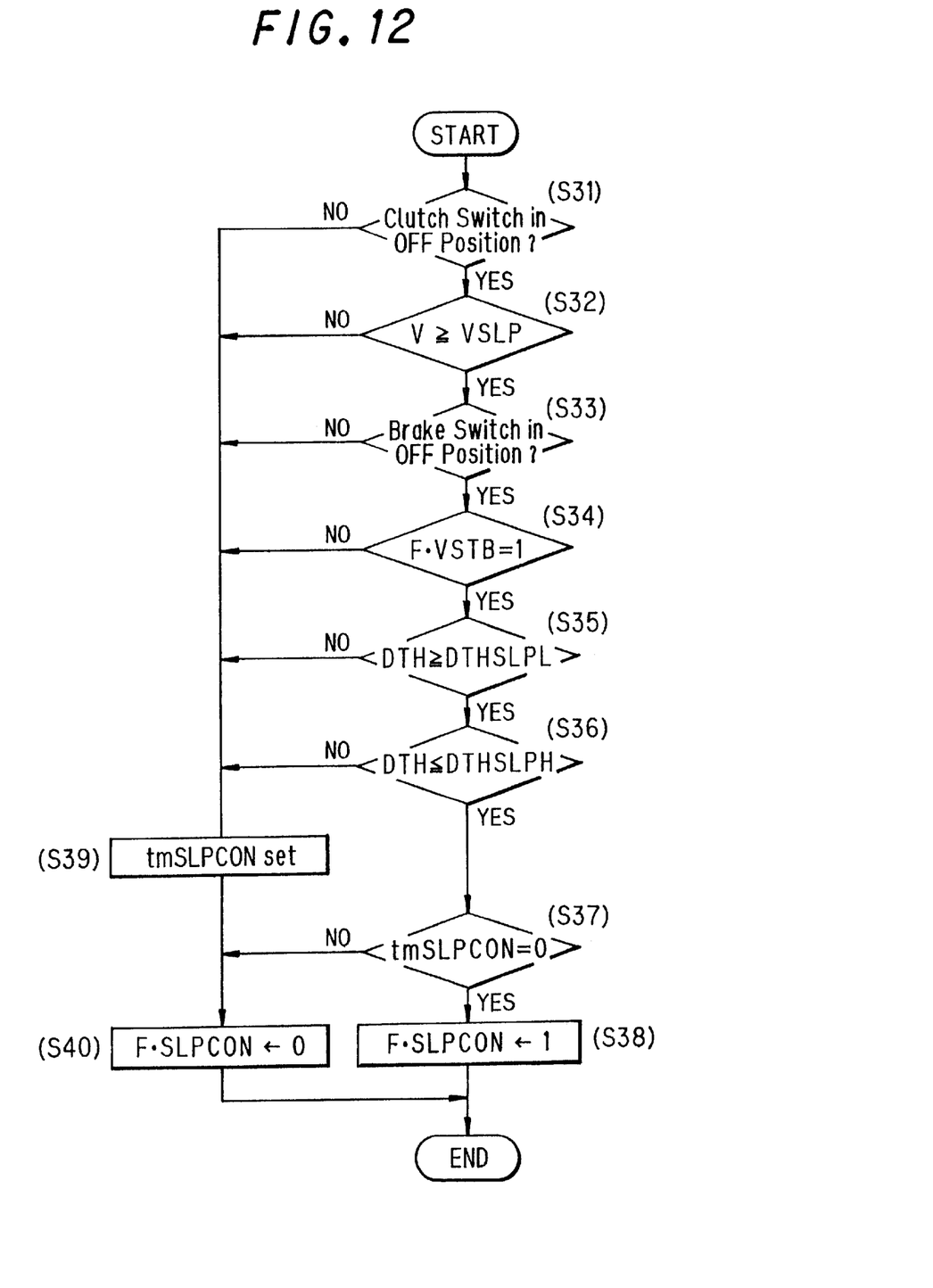
FIG. 12 is a flowchart depicting the procedure of judging conditions for calculating a road slope.

FIG. 12 is a flowchart depicting the process of judging the conditions of calculating the gradient of a road whereon the vehicle is running.

In Step S17, the generation control device examines whether a clutch switch is in the OFF position. If so, the control device further examines whether the current running speed V of the vehicle is higher than a lower limit value VSLP specified as a requisite condition for calculating the road gradient (in Step S32). If V≧VSLP, the control device examines whether a brake switch is in the OFF position (in Step S33). If so, the system examines whether the Flag F•VSTB is in the state <1> as according to the monitored speed variation (in Step S34). With the flag set in the state <1>, the control device proceeds to Step S35 where it examines whether the throttle variation value DTH is higher than the lower limit value DTHSLPL of the throttle variation. If DTH≧DTHSLPL, then the control device examines whether the throttle variation value DTH is lower than the upper limit value DTHSLPH. If DTH≦DTHSLPH, the control device proceeds to Step S37 to examine whether a timer tm SLPCON for counting a time duration necessary for stabilizing the calculation conditions indicates zero. If so, the control device sets the Flag F•SLPCON in the state <1> to indicate the establishment of the conditions for calculating the road gradient (in Step S38) and ends the processing operation. If the timer was not in the state <0>, the control device sets the Flag F•SLPCON in the state <0> (in Step S40) and finishes the processing. In case if the examinations of Steps S21 to S26 were all negatively answered, the control device activates the timer tmSLPCON (in Step S39), sets the Flag F•SLPCON in the state <0> (in Step S40) and, then, ends the processing.

In Step S7 of the road gradient calculating operation, a grade resistance is calculated. In this instance, the rode slope is estimated from a difference between an actual driving torque and running resistance and then correction is made for a load from the road.

Figure 13:
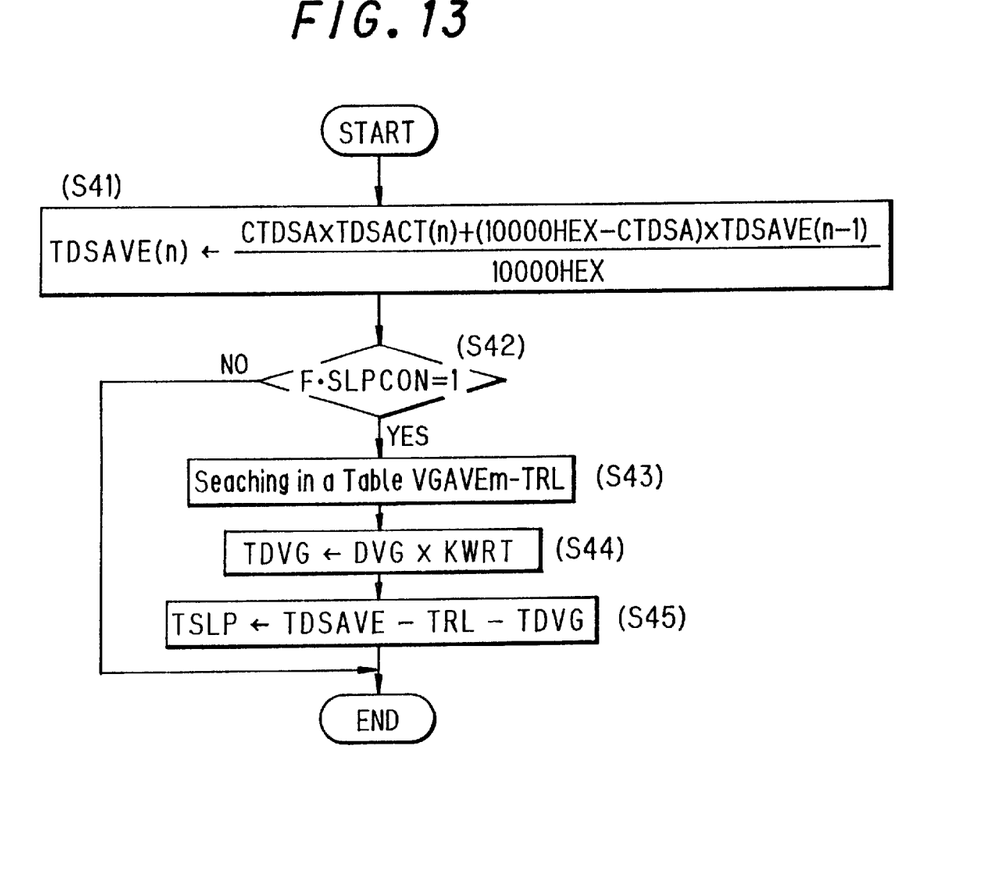
FIG. 13 is a flowchart depicting the processing of calculating a grade resistance.

FIG. 13 is a flowchart depicting the procedure of calculating the grade resistance.

In Step S44, the control device calculates an averaged value TDSACT of the actual driving torque TDSAT (in Step S41) and examines whether the Flag F•SLPCON is set in the state <1> indicating the establishment of the road gradient calculation conditions (in Step S42). With the flag set in the state <1>, the control device searches for a running resistance value TRL corresponding to the averaged speed value VGAVEm in a table of TRL values (in Step S43). If the flag is not set in the state <1>, the system finishes the processing.

Figure 14:
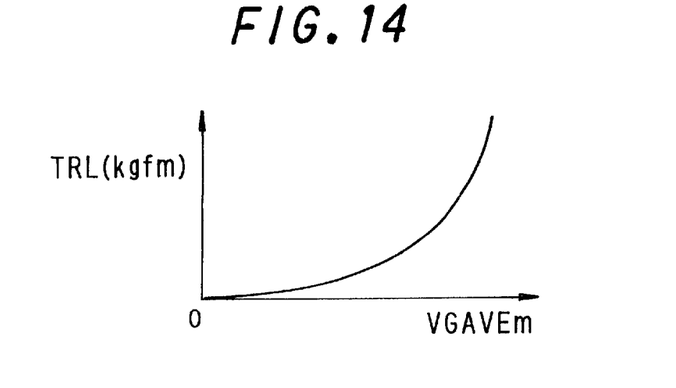
FIG. 14 is a graph showing a correlation between a running resistance value TRL and an average velocity value VGVE for retrieval of tabulated values of running resistance.

FIG. 14 is a graph showing a characteristic curve of a vehicle running resistance value TRL vis an averaged vehicle running speed VGAVEm, which data is stored in the running resistance table. The running resistance is a sum of an air-resistance value and a rolling resistance value, which values are based on actual measurements (not theoretical calculations) and tabulated depending upon the vehicle running speed that is, however, an average-calculated value at that time. An accelerating resistance value TDVG is then calculated by multiplying the vehicle running-speed variation DVG (for calculation of the road gradient) by a specified variable KWRT (in Step S44). The variable KWRT used for calculating the accelerating resistance is uniquely determined according to the following equation:

KWRT=(Vehicle Mass (kg)+Mass (kg) of a Rotating portion)×a Wheel Tire Radius (m)×Conversion Value in DVG Unit (m/s).

A grade resistance TSLP is then calculated by subtracting the running resistance value TRL plus the accelerating resistance value TRL from the averaged-actual-driving-torque-value RDSAVE (in Step S45).

Finally, in Step S8 of the road gradient calculating operation, the control device computes an actual slope value from the grade resistance TSLP.

Figure 15:
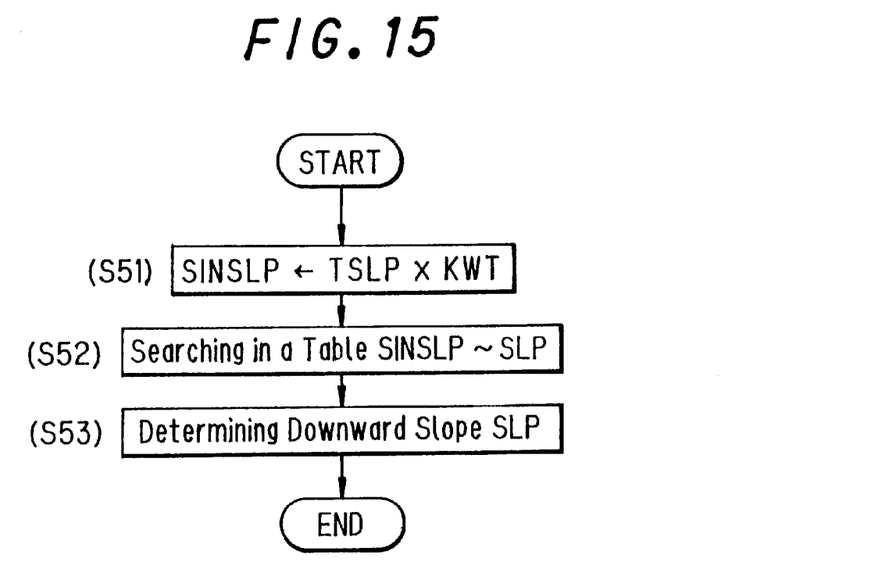
FIG. 15 is a flowchart depicting the processing of calculating a road slope.

FIG. 15 is a flowchart depicting the slope calculating operation. In Step S51, the regeneration control device determines a slope SIN-value SINSLP by multiplying the grade resistance value TSLP by a specified variable KWT (for calculating a slope value). This variable can be uniquely determined as a reciprocal of a mass×a wheel tire radius. The slope value corresponding to the determined slope SIN-value SINSPLP is searched in a table of SLP values (Step S52) and the value found therein is set as the slope value (in Step S53).

Figure 16:
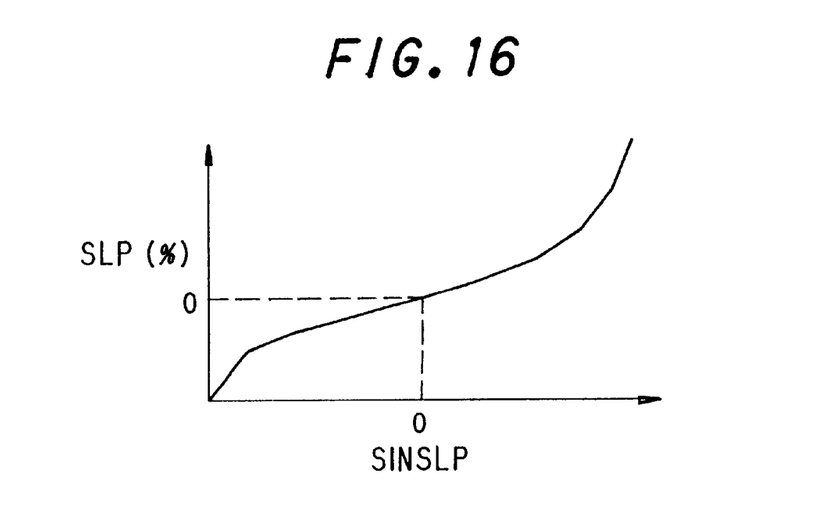
FIG. 16 is a graph showing a correlation between road slope values SLP and a road-slope SIN-values SINSLP stored in a table.

FIG. 16 is a graph showing a characteristic curve of a slope value SLP vis a slope SIN-value SINSLP, which data is stored in the table of SLP values.

As is apparent from the foregoing, the regeneration control device for a hybrid vehicle according to the present invention, which controls the regenerative deceleration system including an internal combustion engine, driving wheels drivable by the internal combustion engine, a motor for additionally supplying electric power for driving the driving wheels, a transmission between the engine, motor and driving wheels and an accumulator for supplying electric power to the motor and receives an electrical charge from the motor, wherein the motor can, during decelerating period, work as a generator the output of which is determined depending upon the deceleration degree and returned to the accumulator. This regeneration control device includes calculating means for determining a degree of slope of a road and correcting means for correcting regeneration of electric energy according to the road gradient determined by the calculating means, and it can correct the output of the motor-generator to a suitable value at which the accumulator may not fully be charged with electric energy from the motor during the deceleration, thus assuring effective regeneration while the vehicle running downward on the slope.

The regeneration correcting means can reduce a regeneration value with increasing degree of descending slope determined by the gradient calculating means so that the accumulator may not be fully charged with regenerated energy while the vehicle running downward on the slope with increased rotations of the motor-generator.

The regeneration control device according to another aspect of the present invention is further provided with correcting means for correcting a gear ratio of an automatic transmission in accordance with the degree of slope of a road whereon the vehicle is descending. This can increase a decelerating torque by correcting the gear ratio of the automatic transmission to correspondingly reduce the regeneration, preventing the accumulator from being fully charged with regenerated power.

The regeneration control device according to still another aspect of the present invention is further provided with correcting means for correcting a gear ratio of a hand-operated transmission according to a position of the transmission gear, which means can decrease the regeneration value when setting a transmission lever into a lower speed position. Namely, the regeneration value can be corrected suitably for respective steps of deceleration, thus preventing the accumulator from being fully charged with regenerated energy that may be increased with decreasing gear ratio and with increasing decelerating torque G (i.e., increasing the number of rotations of the engine).

What is claimed is:

1. A regeneration control device for use in a hybrid vehicle, which includes an internal combustion engine, driving wheels drivable by the internal combustion engine, a motor for additionally providing the driving wheels with electric power, said motor capable of working as a generator while braking the vehicle, a transmission between the engine, motor and driving wheels and an accumulator for supplying the motor with electric power and storing electric energy regenerated by the motor depending upon a deceleration degree, characterized in that it is provided with calculating means for determining the degree of slope of a road and correcting means for correcting regeneration of electric energy according to the road slope determined by the calculating means while using the motor as the generator, the output of which is corrected and returned to charge the accumulator.

2. A regeneration control device as defined in claim 1, characterized in that the regeneration correcting means reduces the regeneration of electric energy as the downward slope degree determined by the gradient calculating means increases while the vehicle descending on the slope.

3. A regeneration control device as defined in any of claims 1 and 2, characterized in that it is further provided with a gear-ratio correcting means for correcting a gear-ratio of the transmission of an automatic type according to the downward slope degree determined by the gradient calculating means while the vehicle descending on the slope.

4. A regeneration control device as defined in claim 3, characterized in that the gear-ratio correcting means increases the gear ratio as a downward slope degree determined by the gradient calculating means increases while the vehicle descending on the slope.

5. A regeneration control device as defined in claim 1, characterized in that the regeneration correcting means reduces the regeneration of electric energy when shifting the transmission of a hand-operated type to a lower speed position.

* * * * *